US010043425B2

(12) United States Patent
Brunner et al.

(10) Patent No.: US 10,043,425 B2
(45) Date of Patent: Aug. 7, 2018

(54) TEST PATTERNS FOR MOTION-INDUCED CHROMATIC SHIFT

(71) Applicant: Microsoft Technology Licensing, LLC, Redmond, WA (US)

(72) Inventors: Daniel Brunner, Sammamish, WA (US); Andrew Rosen, Woodinville, WA (US); Andrew Glass, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 264 days.

(21) Appl. No.: 14/667,663

(22) Filed: Mar. 24, 2015

(65) Prior Publication Data

US 2016/0284258 A1 Sep. 29, 2016

(51) Int. Cl.
*G09G 5/02* (2006.01)
*G09G 3/00* (2006.01)
(Continued)

(52) U.S. Cl.
CPC ............ *G09G 3/006* (2013.01); *G02F 1/1309* (2013.01); *G09G 3/3607* (2013.01); *G09G 3/007* (2013.01);
(Continued)

(58) Field of Classification Search
CPC ...... G09G 3/006; G09G 3/3607; G09G 3/007; G09G 5/02; G09G 2320/0242;
(Continued)

(56) References Cited

U.S. PATENT DOCUMENTS 5,532,765 A * 7/1996 Inoue ................ H04N 9/28
348/177
6,924,816 B2 8/2005 Deering
(Continued)

FOREIGN PATENT DOCUMENTS

CN 101277456 10/2008
JP 2008-005192 1/2008

OTHER PUBLICATIONS

International Search Report and Written Opinion dated May 6, 2016, from International Patent Application No. PCT/US2016/021641, 13 pp.
(Continued)

*Primary Examiner* — Peter D McLoone
(74) *Attorney, Agent, or Firm* — Klarquist Sparkman, LLP

(57) ABSTRACT

Display of a test pattern on a liquid crystal display ("LCD") device or other display device can expose a problem with control logic that causes perceptible shifting in color values away from correct color values. For example, a test pattern evaluation tool determines a test pattern that is based at least in part on a base pattern of pixels. The test pattern evaluation tool successively renders the test pattern for display on a display device. In doing so, the test pattern evaluation tool offsets the base pattern by a number of pixels (e.g., shifting by one pixel horizontally) between successive rendering operations at the native refresh rate of the display device, which facilitates evaluation of whether chromatic shift is induced among at least some sub-pixel display elements of the display device.

23 Claims, 10 Drawing Sheets

(51) Int. Cl.
*G02F 1/13* (2006.01)
*G09G 3/36* (2006.01)

(52) U.S. Cl.
CPC ....... *G09G 5/02* (2013.01); *G09G 2320/0242* (2013.01); *G09G 2320/0261* (2013.01); *G09G 2320/0295* (2013.01); *G09G 2320/0693* (2013.01)

(58) Field of Classification Search
CPC ... G09G 2320/0261; G09G 2320/0295; G09G 2320/0693; G02F 1/1309
See application file for complete search history.

(56) References Cited

U.S. PATENT DOCUMENTS

| | | | |
|---|---|---|---|
| 7,436,488 B2 | 10/2008 | Sugita | |
| 7,728,616 B2 * | 6/2010 | Park | G09G 3/006 324/750.19 |
| 8,090,218 B2 | 1/2012 | Larkin et al. | |
| 8,248,454 B2 * | 8/2012 | Thielman | G06F 3/1423 348/14.07 |
| 8,350,934 B2 * | 1/2013 | Chao | H04N 5/3572 348/187 |
| 8,390,642 B2 * | 3/2013 | Frederick | G09G 3/2003 345/102 |
| 8,441,697 B2 | 5/2013 | Fletcher et al. | |
| 8,482,698 B2 | 7/2013 | Atkins | |
| 8,866,920 B2 | 10/2014 | Venkataraman et al. | |
| 9,514,508 B2 * | 12/2016 | Ballestad | G09G 5/00 |
| 9,532,020 B2 * | 12/2016 | Hara | H04N 9/3194 |
| 2005/0277815 A1 * | 12/2005 | Taniguchi | A61B 6/461 600/300 |
| 2006/0279563 A1 * | 12/2006 | Shen | G09G 3/2092 345/207 |
| 2007/0001710 A1 * | 1/2007 | Park | G09G 3/3611 324/750.19 |
| 2009/0122132 A1 * | 5/2009 | Thielman | G06F 3/1423 348/14.08 |
| 2010/0066850 A1 * | 3/2010 | Wilson | H04N 17/04 348/222.1 |
| 2010/0277492 A1 * | 11/2010 | Frederick | G09G 3/2003 345/589 |
| 2010/0328447 A1 * | 12/2010 | Watson | G06F 3/1446 348/135 |
| 2011/0012908 A1 * | 1/2011 | Daly | G09G 3/006 345/581 |
| 2012/0001951 A1 * | 1/2012 | Katagawa | G09G 3/3648 345/690 |
| 2012/0075354 A1 * | 3/2012 | Su | G09G 5/10 345/690 |
| 2012/0098975 A1 * | 4/2012 | Chao | H04N 5/3572 348/187 |
| 2014/0333660 A1 | 11/2014 | Ballestad et al. | |
| 2015/0049004 A1 | 2/2015 | Deering et al. | |
| 2015/0319415 A1 * | 11/2015 | Hara | H04N 9/3194 356/121 |

OTHER PUBLICATIONS

Lai et al., "P-57: Color Shift Evaluation in Motion Image," *SID Int'l Symp.*, pp. 403-406 (May 2007).
Written Opinion dated Aug. 4, 2016, from International Patent Application No. PCT/US2016/021641, 6 pp.
Yanaka, "Use of Periodic Shift and Color Combinations to Enhance Illusory Motion," *ACM SIGGRAPH*, 1 p. (Aug. 2012).
Artamonov, "LCD Panels with Response Time Compensation: 7 Monitors Reviewed," downloaded from the World Wide Web, 38 pp. (Dec. 2005).
Binckley, "High Definition Block—Defining High Definition," downloaded from the World Wide Web on Mar. 24, 2015, 3 pp. (document not dated).
Blur Busters, "LCD Motion Artifacts: Overdrive," downloaded from the World Wide Web, 5 pp. (Sep. 2013).
Eberle, "NEC EA274WMi Monitor Review: Eco-Friendly At 2560×1440," *Tom's Hardware*, 28 pp. (May 2014).
Feng et al., "P-50: Dynamic Gamma: Applications to Improve LCD Temporal Response Using Overdrive," *SID Digest*, vol. 36, Issue 1, pp. 462-465 (May 2005).
Kumar et al., "Image Compression by Moment Preserving Algorithms: A Scrutinization," *Int. J. Comp. Tech Appl*, vol. 2, No. 4, pp. 1099-1117 (Jul. 2011).
Laird, "The Dark Side of Overdrive," downloaded from the World Wide Web, 10 pp. (Feb. 2009).
"LCD Monitor Test Images," downloaded from the World Wide Web on Feb. 24, 2015, 1 p. (document marked May 2008).
Park et al., "Structural Similarity Based Image Compression for LCD Overdrive," *IEEE Trans. on Consumer Electronics*, vol. 58, No. 4, pp. 1276-1284 (Nov. 2012).
"Response Time—Lagom LCD Test," downloaded from the World Wide Web on Feb. 24, 2015, 4 pp. (document marked Apr. 2008).
Simmons, "Factors Affecting PC Monitor Responsiveness," *PC Monitors*, 10 pp. (Dec. 2013; document marked: last updated: Jan. 2015).
Tektronix, "Camera Measurements—Application Note," downloaded from the World Wide Web on Feb. 23, 2015, 16 pp. (document marked Nov. 2007).
Wang et al., "A High Compression Ratio Image Coding for Frame Memory Reduction in LCD Overdrive," *Int'l Tech. Conf. on Circuits/Systems, Computers and Communications*, pp. 1629-1632 (Jul. 2008).
Wang et al., "Adaptive Multi-level Block Truncation Coding for Frame Memory Reduction in LCD Overdrive," *IEEE Trans. on Consumer Electronics*, vol. 56, No. 2, pp. 1130-1136 (May 2010).
International Preliminary Report on Patentability dated Dec. 1, 2016, from International Patent Application No. PCT/US2016/021641, 9 pp.
Communication pursuant to Rules 161(1) and 162 EPC dated Nov. 2, 2017, from European Patent Application No. 16711939.5, 2 pp.

* cited by examiner

FIG. 1   sub-pixel display element of liquid crystal display (LCD) device
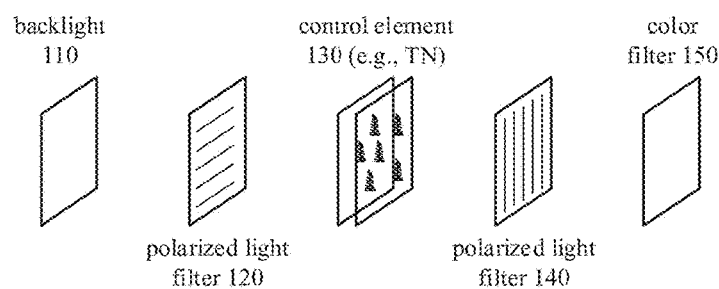
FIG. 2   changes in levels for sample value and display element
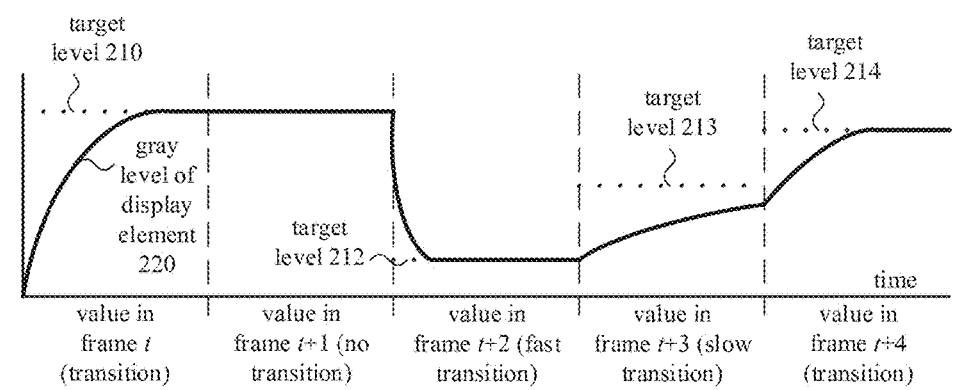

changes with no overdrive changes with correct overdrive changes with too much overdrive

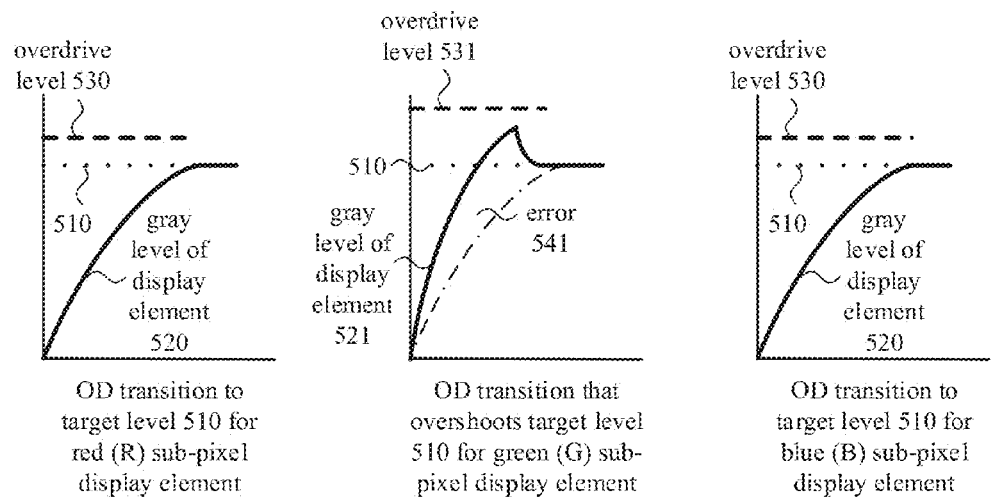
FIG. 5a — pink/magenta chromatic shift in darkening transition between two gray scale values due to overdrive for green (G) exceeding overdrive for red (R) and blue (B)
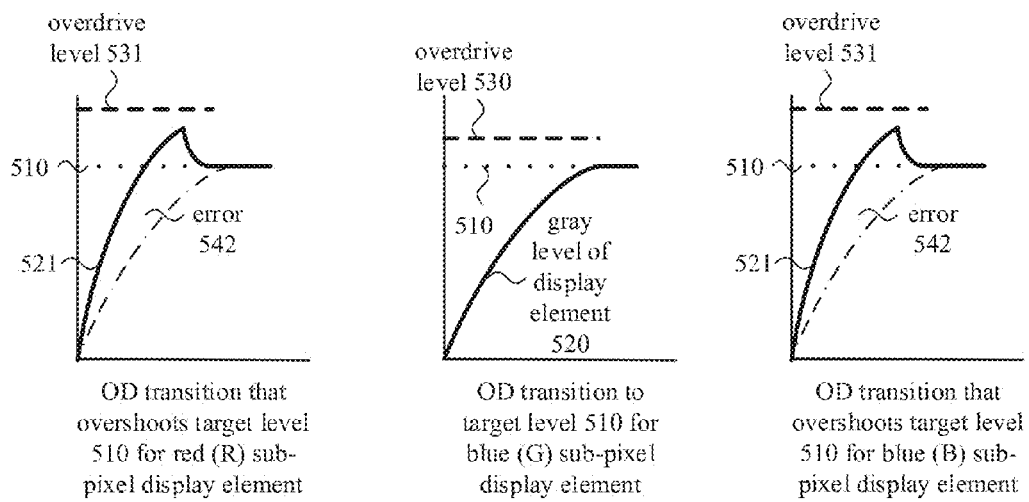
FIG. 5b — green chromatic shift in darkening transition between two gray scale values due to overdrive for red (R) and blue (B) exceeding overdrive for green (G)

FIG. 5c  pink/magenta chromatic shift in brightening transition between two gray scale values due to overdrive (underdrive) for red (R) and blue (B) exceeding overdrive for green (G)

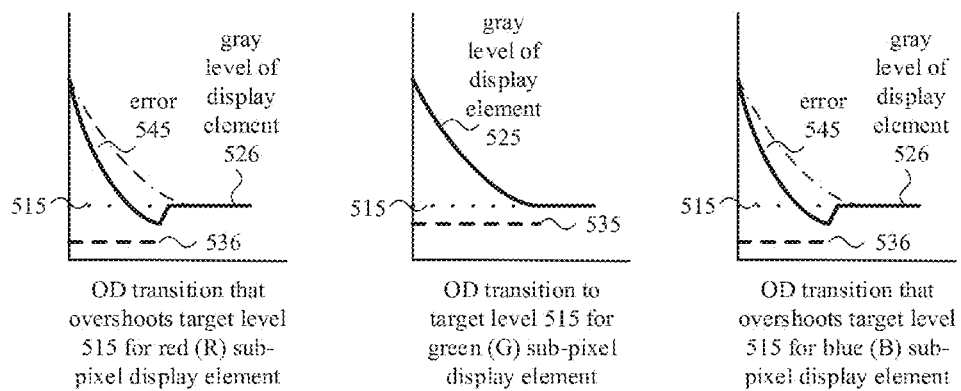

OD transition that overshoots target level 515 for red (R) sub-pixel display element OD transition to target level 515 for green (G) sub-pixel display element OD transition that overshoots target level 515 for blue (B) sub-pixel display element FIG. 5d  green chromatic shift in brightening transition between two gray scale values due to overdrive (underdrive) for green (G) exceeding overdrive for red (R) and blue (B)

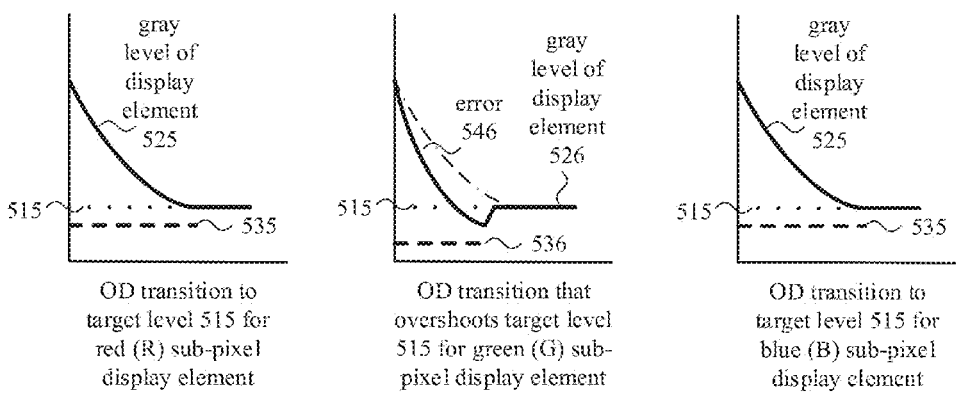

OD transition to target level 515 for red (R) sub-pixel display element

OD transition that overshoots target level 515 for green (G) sub-pixel display element OD transition to target level 515 for blue (B) sub-pixel display element

FIG. 7a 701

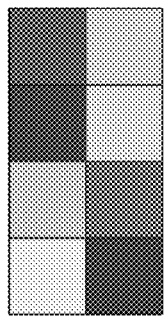

first 2x4 pattern of pixels with grayscale sample values

FIG. 7b 702

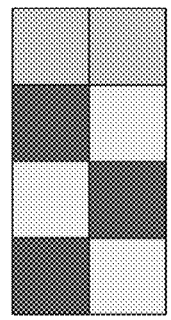

second 2x4 pattern of pixels with grayscale sample values

FIG. 8 800

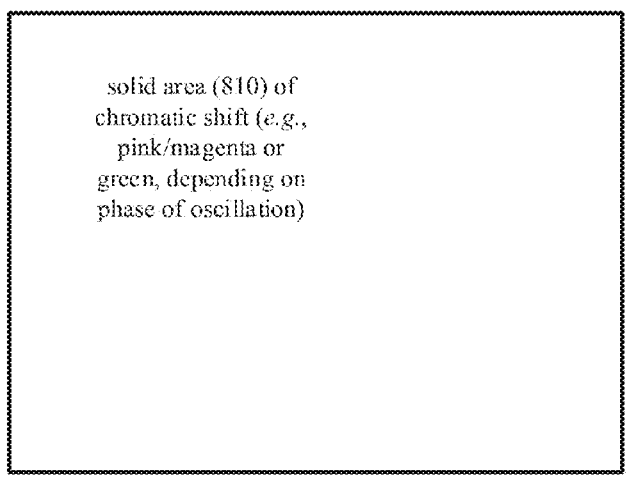

solid area (810) of chromatic shift (e.g., pink/magenta or green, depending on phase of oscillation)

simple test pattern:
- includes repeated first pattern (701) or second pattern (702) in each frame
- pixels oscillate by one pixel horizontally at refresh rate of display device
- may cause chromatic shift throughout simple test pattern

FIG. 9a  901

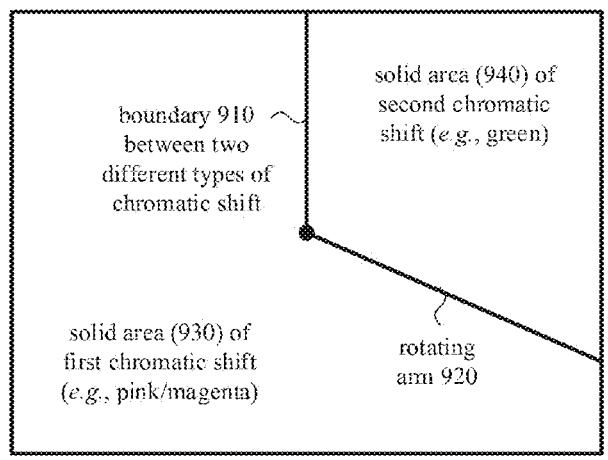

first wipe test pattern:
- includes repeated first pattern (701) or second pattern (702) in each frame
- pixels oscillate by one pixel horizontally at refresh rate of display device
- pixels oscillate in opposite phase in each new rotation, starting at boundary (910)
- may cause different chromatic shifts behind arm (920) and ahead of arm (920)

FIG. 9b  902

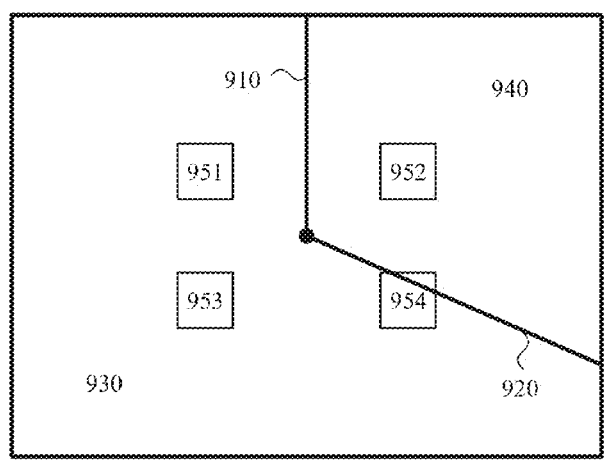

second wipe test pattern:
- includes features of first wipe test pattern (901)
- also includes areas (951-954) of reference colors for possible chromatic shift degrees

FIG. 10   1001

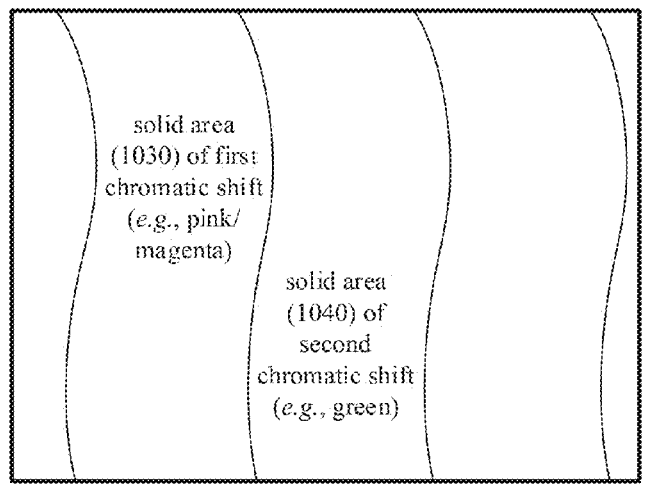

warp test pattern:
- includes repeated first pattern (701) or second pattern (702) in each frame, modified by scaling factors and/or stretching factors
- pixels oscillate by one pixel horizontally at refresh rate of display device
- may cause different chromatic shifts in alternating waves

FIG. 11a   1101

```
Sub RenderDistanceAlt()
  Dim x As Double
  Dim y As Double
  Dim DimX As Double
  Dim DimY As Double
  Dim R As Double
  Dim G As Double
  Dim B As Double
  Dim PI As Double
  Dim Samples As Double
  Dim StartColor As Double
  Dim EndColor As Double
  Dim ColorSteps As Double
  Dim Angle As Double
  Dim SineOfAngle As Double
  Dim Radius As Double
  Dim tempX As Double
  Dim tempY As Double
  Dim z As Double
  Dim Circumference As Double
  Dim CenterX As Integer
  Dim CenterY As Integer
  Dim Distance As Double
  Dim LengthX As Double
  Dim LengthY As Double
  Dim LengthXSquared As Double
  Dim LengthYSquared As Double
  Dim SqrXY As Double
``` continued in
FIG. 11b

FIG. 11b  1101 continued from
FIG. 11a

```
PI = 3.14159265358979
Radius = 5
Samples = 64
StartColor = 16
EndColor = 235
DimX = 200
DimY = 200
ColorSteps = EndColor - StartColor For x = 1 To DimX
   For y = 1 To DimY LengthX = (DimX / 2) - x
   LengthY = (DimY / 2) - y If LengthX <> 0 Then
      LengthXSquared = Math.Abs(LengthX) ^ 2
      Else: LengthXSquared = 0
   End If If LengthY <> 0 Then
      LengthYSquared = Math.Abs(LengthY) ^ 2
      Else: LengthYSquared = 0
   End If Distance = Math.Sqr(LengthXSquared + LengthYSquared)

Angle = ((Distance / Samples) * 360) + (270 - (360 / Samples))
   SineOfAngle = Math.Sin((Angle * PI) / 180.001)

R = ((ColorSteps * (Math.Sin(Angle) + 1)) / 2) + StartColor

Worksheets("Sheet1").Cells(y, x).Select
   Selection.Value = R

Selection.Interior.Color = RGB(R, R, R)

Next y
Next x

End Sub
```

FIG. 12    1200
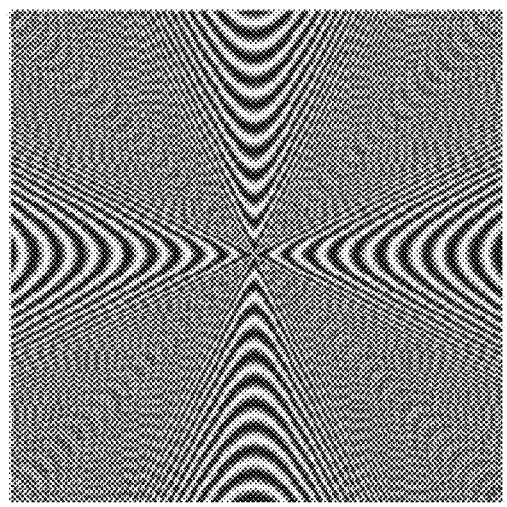
FIG. 13
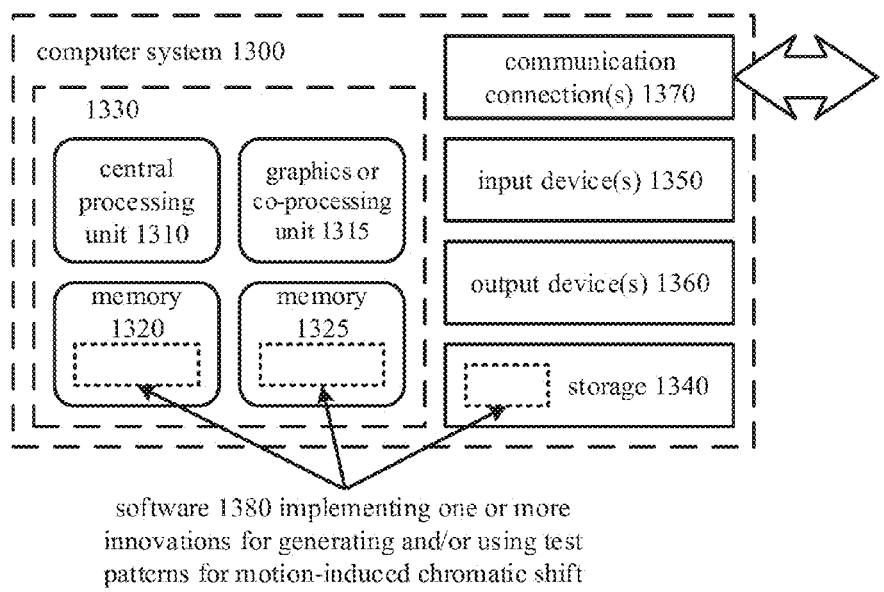
software 1380 implementing one or more
innovations for generating and/or using test
patterns for motion-induced chromatic shift

TEST PATTERNS FOR MOTION-INDUCED CHROMATIC SHIFT

BACKGROUND

A test pattern can allow a user to troubleshoot, adjust, or calibrate settings of a display device, such as a television set, computer monitor, video receiver, or other device that visually presents information. In the early days of broadcast television, a test pattern was generated by pointing a camera at a test card, and broadcasting the recorded images of the test card. A user could use the broadcast images of the test card to calibrate a television set. Later, images of test patterns were generated by special equipment and broadcast. More recently, a test pattern can be distributed on digital media and played back on a display device, or be stored in onboard memory of a display device and accessed through a settings menu, or even be downloaded and run in a Web browser.

Typically, a test pattern depicts a known pattern of shapes and/or colors, or depicts a sequence of such patterns. For some types of test pattern, a setting of a display device can be tuned, calibrated, or otherwise adjusted while viewing the test pattern or after viewing the test pattern. In many cases, a test pattern will not be displayed correctly until a setting of the display device is appropriately adjusted. In other cases, using a test pattern, a user can tune performance of the display device according to personal preferences. For example, some test patterns for a liquid crystal display ("LCD") device can allow a user to calibrate various settings, such as contrast, sharpness, saturation, black level, timing (clock, phase), and gamma.

For other types of test pattern, a problem with a display device or characteristic of the display device can be diagnosed, but the display device is not adjusted. Thus, in some cases, display of a test pattern may induce some behavior in a display device that illustrates a problem with the display device, so as to help a user or manufacturer identify and diagnose the problem. As another example, certain test patterns for an LCD device can allow a user to assess features such as viewing angle of the LCD device.

SUMMARY

In summary, the detailed description presents test patterns for motion-induced chromatic shift. In particular, display of one of the test patterns on a liquid crystal display ("LCD") device can expose a problem with the control logic for the LCD device that causes perceptible shifting in color values away from correct color values. For example, when the LCD device displays a detailed, textured pattern of values that moves slightly from frame to frame, the problem may cause color values to shift towards green, or the problem may cause color values to shift towards pink or magenta. In actual use displaying regular images, such chromatic shifts may be noticeable by a user in areas of grayscale values (e.g., white, light gray, dark gray) that unexpectedly show flickering traces of pink, magenta, or green.

According to one aspect of the innovations described herein, a test pattern evaluation tool (e.g., in a computer system connected to a display device or onboard the display device) determines a test pattern that is based at least in part on a base pattern of pixels. For example, the test pattern evaluation tool determines the test pattern by loading the test pattern from a library of multiple predefined test patterns. Each of the pixels in the base pattern includes multiple sub-pixel sample values (e.g., red, green, and blue sample values).

The test pattern evaluation tool successively renders the test pattern for display on the display device. In doing so, the test pattern evaluation tool offsets the base pattern by a number of pixels (e.g., shifting by one pixel horizontally) between successive rendering operations for the test pattern. The number of pixels can indicate an integer offset (e.g., 1 pixel, 2 pixels, 3 pixels) or fractional offset (e.g., ½ pixel, ¼ pixel). This can facilitate evaluation of whether chromatic shift is induced among at least some sub-pixel display elements of the display device. For example, the offsetting of the base pattern happens at the native refresh rate of the display device. In particular, the base pattern and offsetting can be configured to trigger chromatic shift in response to imbalances introduced by control logic in overdrive adjustments among the sub-pixel display elements. Or, the base pattern and offsetting can be configured to trigger chromatic shift in response to imbalances in transition times among the sub-pixel display elements that are introduced by some other factor.

The innovations can be implemented as part of a method, as part of a computer system configured to perform the method, or as part of computer-readable media storing computer-executable instructions for causing a processor, when programmed thereby, to perform the method. The computer-readable media do not include carrier waves or signals per se. The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIG. 1 is a diagram illustrating example components of a sub-pixel display element of an LCD device.

FIG. 2 is a chart illustrating examples of changes in levels over time for a sample value and sub-pixel display element of an LCD device.

FIGS. 5a-5d are diagrams illustrating examples of chromatic shift.

FIGS. 7a and 7b are diagrams illustrating example base patterns of a test pattern for motion-induced chromatic shift.

FIGS. 8, 9a, 9b, and 10 are diagrams illustrating example test patterns for motion-induced chromatic shift.

FIGS. 11a and 11b are a code listing illustrating an approach to generating candidate base patterns for a test pattern for motion-induced chromatic shift, and FIG. 12 is a graphic illustrating a pattern generated according to the code listing.

FIG. 13 is a diagram illustrating an example computer system in which some of the innovations described herein can be implemented.

DETAILED DESCRIPTION

Figure 3A:
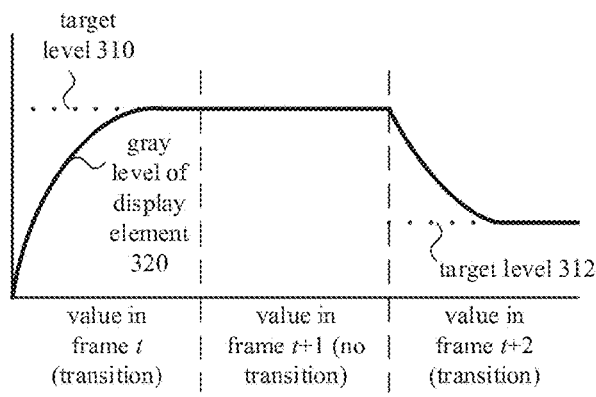
FIGS. 3a-3c are charts illustrating examples of changes in levels over time for a sample value and sub-pixel display element of an LCD device with different levels of overdrive.

The detailed description presents test patterns for motion-induced chromatic shift. In particular, display of one of the test patterns on a liquid crystal display ("LCD") device can expose a problem with the control logic for the LCD device, when the problem causes shifting in color values (chromatic shift) away from correct color values. For example, when the LCD device displays a detailed, textured pattern of values that moves slightly from frame to frame, color values may shift towards green, or the color values may shift towards pink or magenta. In actual use displaying regular images, such chromatic shifts may be noticeable by a user in areas of grayscale values (e.g., white, light gray, dark gray) that unexpectedly show flickering traces of pink, magenta, or green.

I. Characteristics of LCD Devices

This section describes various characteristics of LCD devices.

A. Example Sub-Pixel Display Element

FIG. 1 shows example components of a sub-pixel display element of an LCD device, including two polarized light filters (120, 140), a control element (130), and a color filter (150). For the sake of simplicity, other components such as layers of glass for separation are not shown.

The backlight (110) is a light source for the LCD device. In practice, an LCD device can include a single backlight or multiple backlights in different sections of the LCD device. The backlight (110) can strobe or be continuous. The first polarized light filter (120) blocks light from the backlight (110) that does not have a particular polarization. For example, the first polarized light filter (120) passes light having 0 degree polarization, but blocks other light.

The control element (130) includes liquid crystals that react to a voltage applied across the control element (130), selectively changing the polarization of light that has passed through the first polarized light filter (120). The control element (130) can use twisted nematic technology, in-plane switching technology, fringe field switching technology, vertical alignment technology, blue phase mode technology, or another liquid crystal technology. At one extreme (e.g., no voltage), the polarization of the light passing through the control element (130) undergoes a "full" change in polarization (e.g., 90 degrees, 270 degrees). At another extreme (e.g., full voltage), the polarization of the light passing through the control element (130) is unchanged. Between these two extremes, the polarization of the light passing through the control element (130) changes depending on the voltage applied across the control element (130).

The second polarized light filter (140) blocks light from the control element (130) that does not have a particular polarization. For example, the second polarized light filter (120) passes light having 90 degree polarization, but blocks other light. In the example shown in FIG. 1, light whose polarization is unchanged by the control element (130) is completely blocked by the second polarized light filter (140) (i.e., to produce a black level, no brightness), and light whose polarization is "fully" changed by the control element (130) passes through the second polarized light filter (140) (i.e., to produce a white level, full brightness). Intermediate levels of brightness (i.e., grayscale values between white and black) are produced by controlling the voltage applied to the control element (130). (In other variations of LCD technology, the two polarized light filters pass the same polarization of light, and a black level is produced when a control element "fully" changes the polarization of light. Various other features of LCD technology also change depending on implementation.)

Finally, a color filter (150) filters certain wavelengths of the light, if any, which has passed through the second polarized light filter (140). For example, the color filter (150) passes red light but blocks other light. Or, the color filter (150) passes green light but blocks other light. Or, the color filter (150) passes blue light but blocks other light. In many LCD devices, a set of sub-pixel display elements for red (R), green (G), and blue (B) provide one pixel. Alternatively, a color filter (150) can pass some other color (e.g., yellow). In any case, aside from the color filter (150), the components of the sub-pixel display elements are usually the same for different colors of sub-pixels. That is, the characteristic that is modulated is the brightness, or gray level, of the light that reaches the color filter (150). Alternatively, the functionality of the color filter (150) is provided by a different component of the sub-pixel display element.

The ordering and placement of the R, G, and B sub-pixel display elements can change depending on implementation. For example, R, G, and B sub-pixel display elements are repeated one after the other (R, G, B, R, G, B, R, G, B . . . ) in a row of pixels, row-after-row in an LCD device. One row can include 1024, 1920, or more pixels, and an LCD device can include 768, 1080, or more rows. Alternatively, an LCD device orders R, G, and B sub-pixel display elements in a different way.

B. Transitions Between Levels

FIG. 2 illustrates examples of changes in levels over time for a sample value and sub-pixel display element of an LCD device. The sample value at a given location can change frequently. In some LCD devices, a new sample value for a sub-pixel display element can be specified 30 times per second, 60 times per second, or some other number of times per second. The refresh rate (sometimes called native refresh rate) of a display device indicates how many times per second the display device can be updated. Common refresh rates include 30 hertz and 60 hertz. Changes in the desired sample value ("target level" of brightness, or gray level) are typically provided by computer hardware or software, which can compute the target levels very rapidly. In contrast, a sub-pixel display element of an LCD device may take much longer to transition between two gray levels, in large part due to limits on how quickly the liquid crystals in the control elements can react to changes in voltage.

In FIG. 2, the target levels (210, 212, 213, 214) for sample values are shown as changing instantaneously at some boundaries between frames t to t+4. If the frame rate is 60 hertz, for example, a new frame is specified every 16.67 milliseconds. The gray level (220) of a sub-pixel display element changes gradually to reach the appropriate target level for a frame. If the target level is unchanged for several frames, the gray level (220) holds at the target level.

For example, for frame t, the gray level (220) of the sub-pixel display element transitions towards the target level (210) after the target level (210) is specified. The transition is not especially fast, but is completed before the next frame starts. The gray level (220) remains unchanged through frame t+1. For frame t+2, the gray level (220) of the sub-pixel display element transitions towards the target level (212) after the target level (212) is specified. The transition in frame t+2 is much faster than the transition in frame t. For frame t+3, the gray level (220) of the sub-pixel display element transitions towards the target level (213), but does not complete before the next target level (214) is specified. That is, the target level (213) for frame t+3 is never reached. Instead, for frame t+4, the gray level (220) of the sub-pixel display element transitions towards the target level (214).

As shown in FIG. 2, the transition time between two gray levels can vary significantly. In practice, fast transitions may take 3-4 milliseconds or less, while slow transitions may take 30-40 milliseconds or more. Some transitions (e.g., white to black, black to white) may happen relatively quickly. Other transitions (e.g., dark gray to light gray) may be much slower, even though the starting and ending gray levels are closer. Times for changes in which voltage is increased for a control element may be faster than times for changes in which voltage is decreased. In general, the transition time for a transition depends on the starting gray level and ending gray level. Slow transition times can cause noticeable degradation in the performance of an LCD device, which may take the form of blurring or "ghosting" artifacts in motion sequences.

C. Overdrive

An LCD device may use "overdrive" technology to reduce the transition time between two gray levels (e.g., white, light gray, dark gray, black). For overdrive, an LCD device initially applies a voltage to "overshoot" a target level, and thereby approach the target level more quickly, but then changes the voltage to match the voltage for the target level. Overdrive, which can also be called response time compensation, can be used in transitions when increasing voltage or used in transitions when decreasing voltage.

Figure 3B:
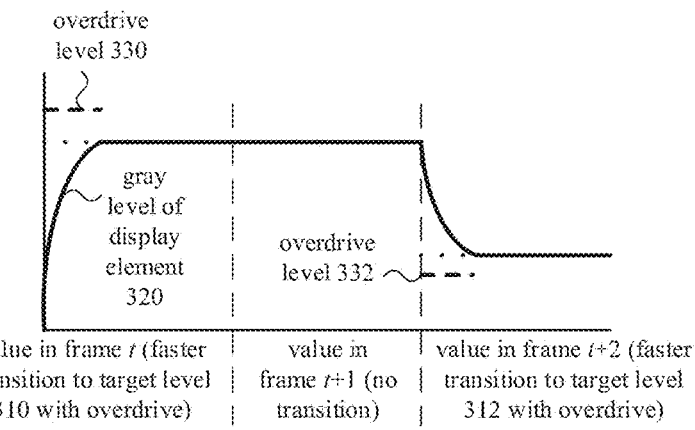
Figure 3C:
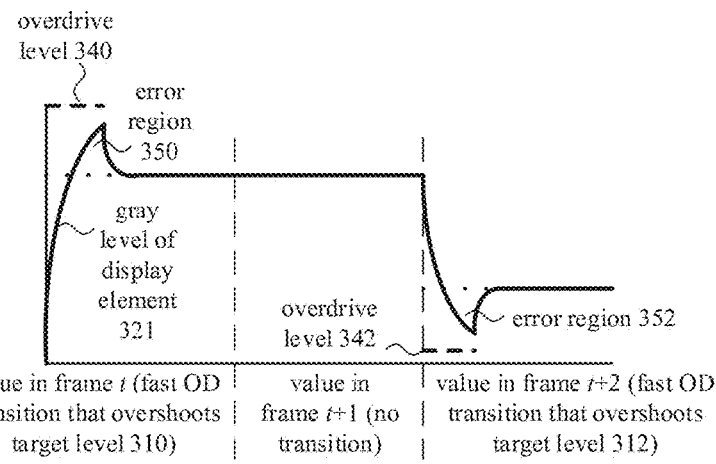

For the sake of comparison with FIGS. 3b and 3c, FIG. 3a shows examples of changes in levels over time for a sample value and sub-pixel display element of an LCD device with no overdrive. The target level (310) for the first two frames is approached during a transition in gray level (320) of a sub-pixel display element in frame t. The gray level (320) is held in the next frame t+1. In frame t+2, a new target level (312) is specified, and the gray level (320) of the display element transitions to the new target level (312).

FIG. 3b shows examples of changes with overdrive correctly applied to reduce transition times. The target levels (310, 312) are the same as in FIG. 3a. For frame t, the LCD device sets an overdrive level (330) that is higher than the target level (310). This overdrive level (330) causes a faster transition to the target level (310). (Compare the curve of the gray level (320) for frame t in FIGS. 3a and 3b.) At an appropriate time, the voltage is adjusted so that the gray level (320) smoothly reaches the target level (310). Similarly, for frame t+2, the LCD device sets an overdrive level (332) that is lower than the target level (312). This overdrive level (332) causes a faster transition to the target level (312). (Compare the curve of the gray level (320) for frame t+2 in FIGS. 3a and 3b.) At an appropriate time, the voltage is adjusted so that the gray level (320) smoothly reaches the target level (312).

Setting the appropriate level of overdrive and controlling the timing of overdrive can be complicated. Just like transition times can depend on the starting gray level and ending gray level for a transition, the appropriate level of overdrive and timing can depend on the starting gray level and ending gray level for a transition. When not enough overdrive is applied, a transition may be too slow. When too much overdrive is applied, the gray level may overshoot the target level, causing distortion sometimes called "inverse ghosting."

FIG. 3c shows examples of changes with overdrive incorrectly applied. The target levels (310, 312) are the same as in FIG. 3a. For frame t, the LCD device sets an overdrive level (340) that is much higher than the target level (310). This overdrive level (340) causes a very fast transition to the target level (310), but the gray level (321) overshoots the target level (310) before returning to the target level (310). For a short period (shown as the error region (350) in FIG. 3c), the gray level is too high, which may be noticeable as inverse ghosting. Similarly, for frame t+2, the LCD device sets an overdrive level (342) that is much lower than the target level (312). This overdrive level (342) causes very fast transition to the target level (312), but the gray level (321) overshoots the target level (312) before returning to the target level (312). For a short period (shown as the error region (352) in FIG. 3c), the gray level is too low, which may be noticeable as inverse ghosting.

Figure 4:
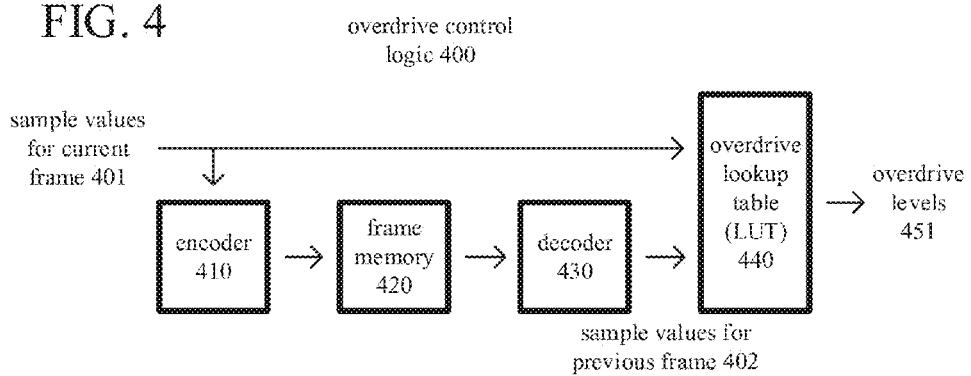
FIG. 4 is a diagram illustrating an example of overdrive control logic in an LCD device.

FIG. 4 shows an example of overdrive control logic (400) in an LCD device. The overdrive control logic (400) includes an overdrive lookup table (440) that maps a sample value (target level) for a location in a current frame (401) and sample value (target level) for the location in the previous frame (402) to an overdrive level (451). The overdrive LUT (440) can include up to p×p entries, where p is the number of possible sample values (target levels). For example, for 8-bit values, the overdrive LUT (440) can include 256×256=65536 entries, where each entry maps a different combination of sample value for the current frame (401) (that is, ending gray level) and sample value for the previous frame (402) (that is, starting gray level) to an overdrive level. Alternatively, the overdrive LUT (440) approximates the starting and ending gray levels to reduce the number of entries in the overdrive LUT (440). Or, instead of using a LUT, the overdrive control logic (400) uses a mapping function to map the gray levels to overdrive levels.

The frame memory (420) can directly store sample values for the previous frame (402). Or, as shown in FIG. 4, to reduce the size of the frame memory (420) (and hence lower the cost of an LCD device), the overdrive control logic (400) can include an encoder (410) that encodes the sample values of the previous frame (402) before the encoded values are stored in the frame memory (420). Typically, the compression applied by the encoder (410) is lossy compression, which reduces the bitrate (and storage cost) of the sample values of the previous frame (402) at the potential cost of distortion/information loss in the sample values. In particular, for certain patterns of sample values, the encoder (410) may approximate the sample values in order to store them in a smaller frame memory. Based on the compressed values in the frame memory (420), the decoder (430) reconstructs a version of the sample values for the previous frame (402). Depending on the amount of distortion/information loss introduced by the encoder (410), the reconstructed sample values may exactly match or poorly approximate the original sample value for the previous frame (402).

The details of the compression scheme applied by the encoder (410) and corresponding decompression scheme applied by the decoder (430) depend on implementation. In many cases, the encoder (410) performs a color space conversion to convert RGB sample values (or other sample values in a format suitable for controlling the sub-pixel display elements of the LCD device) to a YUV-type color space such as YCbCr for encoding. In a YUV-type color space, a Y sample value represents an overall brightness level among input sample values (here, e.g., R, G, and B sample values). U and V sample values (e.g., Cb, Cr)

represent chroma differences. The Y, U, and V sample values are encoded, often using some combination of quantization (approximation) and entropy coding. Typically, Y sample values are encoded more "carefully" than corresponding U and V sample values (e.g., using quantization that is less coarse for Y sample values, or spatially downsampling U and V sample values) because Y sample values are understood to be more important to image quality. In corresponding decompression, a decoder (430) reconstructs the sample values, e.g., using some combination of entropy decoding and inverse quantization. As needed, the decoder (430) inverts a color space conversion performed by the encoder (410), returning sample values to a format suitable for controlling the sub-pixel display elements of the LCD device.

D. Chromatic Shifts

Although the reconstructed sample values of the previous frame (402) are not rendered for display, distortion introduced by the encoder (410) can change which overdrive levels (451) are retrieved using the overdrive LUT (440), which depends on the reconstructed sample values of the previous frame (402). This, in turn, may affect the display of the sample values of the current frame (401). When distortion is introduced by the encoder (410) during compression of U and V sample values (e.g., Cr, Cb values), the reconstructed R, G, and/or B sample values may be different than the corresponding, original sample values before compression with the encoder (410). For example, suppose RGB sample values for the previous frame (402) have Cb and Cr values of 128 after conversion to YCbCr color space (that is, they are grayscale values). Also suppose that, after compression and decompression, the reconstructed Cb and Cr values are not equal to 128 (e.g., the Cb and Cr values are 124, 126, 130, 132, etc.). This will introduce a pink/magenta shift (if the Cb and Cr values are greater than 128) or green shift (if the Cb and Cr values are less than 128) in the reconstructed R and B sample values of the previous frame (402). Such differences in reconstructed R and B sample values for the previous frame (402) may cause the LCD device to apply too much overdrive or not enough overdrive when rendering the sample values for the current frame (401).

In the examples shown in FIGS. 5a-5d, applying voltage to a control element of a sub-pixel display element causes a darker color to be displayed. Applying full voltage causes the control element to reach a state in which the polarization of light passing through the control element is unchanged, and the light is completely blocked by the second polarized light filter—black level. Applying no voltage causes the control element to reach a state in which the polarization of light passing through the control element is fully changed, and the light completely passes through the second polarized light filter—white level. Applying an intermediate voltage causes the control element to reach a state in which an appropriate amount of the light passes through the second polarized light filter—a gray level.

FIG. 5a shows a darkening transition between two gray levels for red, green, and blue sub-pixel display elements. In each of the sub-pixel display elements, the starting gray level is the same, and the target level (510) is the same. An overdrive level (530) is specified for each of the red and blue sub-pixel display elements, resulting in the correct transition of the gray level (520) to the target level (510). For the green sub-pixel display element, however, the overdrive level (531) is too high. As a result, the gray level (521) of the green sub-pixel display element increases (darkens) faster than the gray level (520) for the red and blue sub-pixel display elements. That is, the green sub-pixel display element gets darker faster than the red and blue sub-pixel display elements, causing a pink/magenta chromatic shift (shown as error (541)) until the target level (510) is reached by all of the sub-pixel display elements. The overdrive level (531) for the green sub-pixel display element might be too high, for example, if the reconstructed G sample value of the previous frame (after compression and decompression as described with reference to FIG. 4) is too bright, such that too much overdrive is applied to reach the target level (510). Similarly, a pink/magenta chromatic shift would result if the overdrive level for the green sub-pixel element is correct, but not enough overdrive is applied for the red and blue sub-pixel elements, such that the green sub-pixel display element darkens faster than the red and blue sub-pixel display elements.

FIG. 5b also shows a darkening transition between two gray levels for red, green, and blue sub-pixel display elements. In each of the sub-pixel display elements, the starting gray level is the same, and the target level (510) is the same. An overdrive level (530) is specified for the green sub-pixel display element, resulting in the correct transition of the gray level (520) to the target level (510). For each of the red and blue sub-pixel display elements, however, the overdrive level (531) is too high. As a result, the gray level (521) of each of the red and blue sub-pixel display element increases (darkens) faster than the gray level (520) for the green sub-pixel display element. That is, the red and blue sub-pixel display elements get darker faster than the green sub-pixel display element, causing a green chromatic shift (shown as error (542)) until the target level (510) is reached by all of the sub-pixel display elements. The overdrive level for the red and blue sub-pixel display element might be too high, for example, if the reconstructed R and B sample value of the previous frame (after compression and decompression as described with reference to FIG. 4) are too bright, such that too much overdrive is applied to reach the target level (510). Similarly, a green chromatic shift would result if the overdrive level for the red and blue sub-pixel elements is correct, but not enough overdrive is applied for the green sub-pixel element, such that the green sub-pixel display element darkens slower than the red and blue sub-pixel display elements.

FIGS. 5c and 5d illustrate chromatic shift in brightening transitions. FIG. 5c shows a brightening transition between two gray levels for red, green, and blue sub-pixel display elements. In each of the sub-pixel display elements, the starting gray level is the same, and the target level (515) is the same. An overdrive level (535) is specified for the green sub-pixel display element, resulting in the correct transition of the gray level (525) to the target level (515). For each of the red and blue sub-pixel display elements, however, the overdrive level (536) is too low. As a result, the gray level (526) of each of the red and blue sub-pixel display element decreases (brightens) faster than the gray level (520) for the green sub-pixel display element. That is, the red and blue sub-pixel display elements get brighter faster than the green sub-pixel display element, causing a pink/magenta chromatic shift (shown as error (545)) until the target level (515) is reached by all of the sub-pixel display elements. The overdrive level for the red and blue sub-pixel display element might be too low, for example, if the reconstructed R and B sample value of the previous frame (after compression and decompression as described with reference to FIG. 4) are too dark, such that too much overdrive is applied to reach the target level (515). Similarly, a pink/magenta chromatic shift would result if the overdrive level for the red and blue sub-pixel elements is correct, but not enough overdrive is applied for the green sub-pixel element, such that the green sub-pixel display element brightens slower than the red and blue sub-pixel display elements.

FIG. 5d also shows a brightening transition between two gray levels for red, green, and blue sub-pixel display elements. In each of the sub-pixel display elements, the starting gray level is the same, and the target level (515) is the same. An overdrive level (535) is specified for each of the red and blue sub-pixel display elements, resulting in the correct transition of the gray level (525) to the target level (515). For the green sub-pixel display element, however, the overdrive level (531) is too low. As a result, the gray level (526) of the green sub-pixel display element decreases (brightens) faster than the gray level (520) for the red and blue sub-pixel display elements. That is, the green sub-pixel display element gets brighter faster than the red and blue sub-pixel display elements, causing a green chromatic shift (shown as error (545)) until the target level (515) is reached by all of the sub-pixel display elements. The overdrive level (536) for the green sub-pixel display element might be too low, for example, if the reconstructed G sample value of the previous frame (after compression and decompression as described with reference to FIG. 4) is too dark, such that too much overdrive is applied to reach the target level (515). Similarly, a green chromatic shift would result if the overdrive level for the green sub-pixel element is correct, but not enough overdrive is applied for the red and blue sub-pixel elements, such that the green sub-pixel display element brightens faster than the red and blue sub-pixel display elements.

In other implementations of LCD sub-pixel display elements, as described with reference to FIG. 1, applying full voltage results in a white level, and applying no voltage results in a black level. Cases of chromatic shift still may similarly occur. The darkening transitions shown in FIGS. 5a and 5b would instead be brightening transitions, with chromatic shift in the opposite direction occurring for the respective examples. The brightening transitions in FIGS. 5c and 5d would instead be darkening transitions, with chromatic shift in the opposite direction occurring for the respective examples.

Aside from distortion introduced in compression of the sample values of a previous frame in LCD control logic, chromatic shift may be caused by other factors. For example, overdrive control logic may introduce variations or imbalances in overdrive levels by performing operations or making decisions for an area that includes multiple sample values, instead of making decisions on a per sample value basis. Or, as another example, overdrive control logic may introduce variations or imbalances in overdrive levels if dithering is used to simulate 24-bit color values with 18-bit color values (simulating color values with 8 bits per sample value using color values with 6 bits per sample value). For spatial dithering, for example, suppose four pixels in an area have the same 24-bit color value, which has no exact counterpart among 18-bit color values. The 24-bit color value may be simulated with two or three of the pixels having a first 18-bit color value and the remaining pixel(s) having a different (close) 18-bit color value. Which pixel(s) have the different 18-bit color value can change from frame to frame, in effect providing a low-level motion that may induce chromatic shift, even if a still image such as a photograph is displayed from frame to frame. In any case, chromatic shift may result if latency is different for different types of sub-pixel display elements that should transition to the same target level (e.g., if red and blue sub-pixel display elements are faster than green sub-pixel display elements, or if red and blue sub-pixel display elements are slower than green sub-pixel display elements).

II. Test Patterns for Motion-Induced Chromatic Shift

This section describes test patterns for motion-induced chromatic shift. In particular, display of one of the test patterns on an LCD device can expose a problem with the control logic for the LCD device, when the problem causes shifting in color values (chromatic shift) away from correct color values. In actual use displaying regular images, such chromatic shifts may be noticeable by a user in areas of grayscale values (e.g., white, light gray, dark gray) that unexpectedly show flickering traces of pink, magenta, or green. Such motion-induced color aberrations are caused by sub-pixel display elements not responding at the same rate for a given transition between two gray levels.

In practice, motion-induced chromatic shift typically happens when video includes motion from frame to frame. In some cases, however, repeated display of a still image can trigger motion-induced chromatic shift (e.g., when dithering in LCD control logic introduces small, regular changes in sample values from frame to frame, even in the absence of motion in video). Still-image chromatic shift is a special case (i.e., type) of motion-induced chromatic shift that occurs when low-level changes are introduced in sample values from frame to frame by the display process.

A. Example Uses of Test Patterns for Motion-Induced Chromatic Shift

Figure 6:
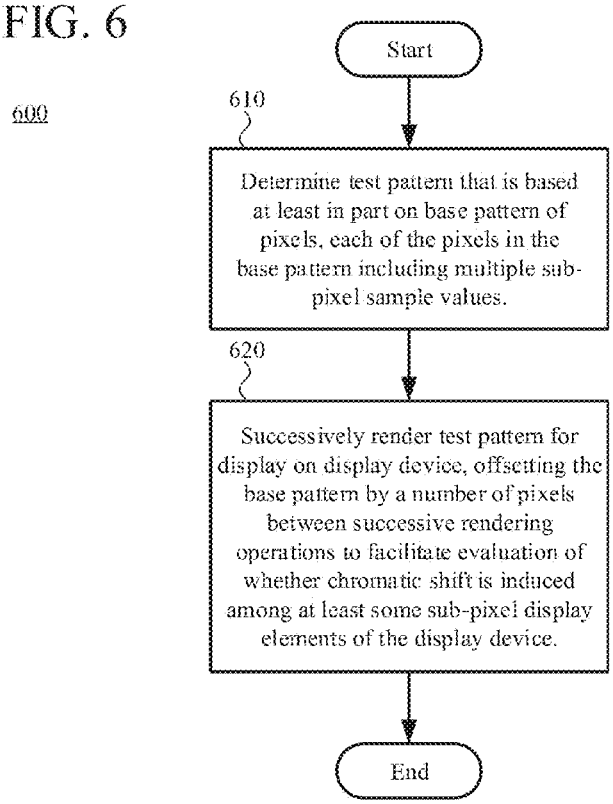
FIG. 6 is a flow chart illustrating a generalized technique of using a test pattern for motion-induced chromatic shift.

FIG. 6 shows a generalized technique (600) of using a test pattern for motion-induced chromatic shift. The technique (600) is performed by a test pattern evaluation tool. The test pattern evaluation tool can be a software program executing on a computer system having an associated display device (e.g., laptop computer, personal computer). The software program can be a special-purpose application for display device evaluation, a control in a Web browser window, or some other software program. Or, the test pattern evaluation tool can be implemented in logic in a hardware component (e.g., as part of system on a chip for a video card, as part of a component of a gaming console). Or, the test pattern evaluation tool can be implemented in a display device itself (e.g., as part of the functionality for an on-screen display menu for device settings or calibration, which may be provided through firmware on the display device).

To start, the test pattern evaluation tool determines (610) a test pattern that is based at least in part on a base pattern of pixels. For example, the test pattern evaluation tool loads the test pattern from a library of multiple predefined test patterns. Alternatively, the test pattern evaluation tool generates the test pattern on-the-fly from a base pattern.

Each of the pixels in the base pattern includes multiple sub-pixel sample values. For example, the base pattern is an n×m pattern of grayscale values (grayscale R, G, B sample values) that is replicated multiple times within the test pattern, where each of n and m is a whole number that is a multiple of 2. FIGS. 7a and 7b show examples of 2×4 base patterns. Alternatively, the base pattern includes another pattern of grayscale values, or the base pattern has another size (e.g., 4×2, 2×3, 3×2, 2×2, 5×3, 3×5, and so on, or a much larger size, up to the size of the test pattern, in which case the base pattern is not replicated or repeated within the test pattern). FIGS. 11a and 11b show one approach to generating a complex pattern that may include areas suitable for a base pattern, as described below. For example, suitable areas for the base pattern may be derived based at least in part on sampling of a sine wave having a period of less than two pixels. To cause motion-induced chromatic shift, complicated base patterns tend to be more effective than simple base patterns.

FIGS. 8, 9a, and 9b show example test patterns in which a base pattern is simply replicated within the test pattern. A base pattern can instead be scaled at various scaling factors, stretched at various stretching factors, and/or distorted at various distortion factors within the test pattern, as described with reference to FIG. 10. Alternatively, the test pattern evaluation tool uses another test pattern.

In many of the foregoing examples, the test pattern uses a base pattern of grayscale values such as white, various shades of gray, and black. Using a test pattern with grayscale values can make chromatic shifts more readily apparent to a human viewer. Alternatively, however, the test pattern evaluation tool can use a test pattern in which a base pattern includes at least some non-grayscale values.

The test pattern evaluation tool successively renders (620) the test pattern for display on a display device, which can be an LCD device or other type of display device with sub-pixel display elements (e.g., a LED device, OLED device, quantum dot display device, where sub-pixel display elements for a pixel may have different transition times). In successively rendering (620) the test pattern, the test pattern evaluation tool offsets the base pattern by a number of pixels between successive rendering operations for the test pattern. The number of pixels can be an integer offset. For example, the test pattern evaluation tool shifts the base pattern one pixel horizontally between the successive rendering operations. The shifting can always be in the same direction (e.g., always left, always right). Or, when the base pattern is a 2×4 pattern, the test pattern evaluation tool causes the base pattern to oscillate regularly between the successive rendering operations (e.g., left, then right, then left, and so on). Alternatively, the test pattern evaluation tool shifts the base pattern one pixel vertically between the successive rendering operations, shifting in the same direction (e.g., always up, always down) or, for some patterns, oscillating. Or, the test pattern evaluation tool shifts the base pattern horizontally then vertically between the successive rendering operations (e.g., left, then down, then right, then up), which may resemble a rotation, as in some dithering for a 2×2 base pattern. Also, the test pattern need not be offset between all successive rendering operations. When offsetting the base pattern between successive rendering operations, offsets can be skipped between some of the successive rendering operations. Alternatively, the test pattern evaluation tool shifts the base pattern by some other number of pixels that causes regular motion in the test pattern. For example, the number of pixels can be a fractional offset such as a ½-pixel offset or ¼-pixel offset. In this case, values for the base pattern at the fractional offset can be derived by interpolation, with the test pattern alternating between the initial values of the base pattern and the interpolated values at the fractional offset. Although interpolation may be computationally intensive, the interpolated values can be determined at design time and directly specified in the test pattern.

The display device has a native refresh rate such as 30 hertz or 60 hertz. In some implementations, the offsetting the base pattern happens at the native refresh rate of the display device, which tends to accentuate motion-induced chromatic shift. For example, the base pattern is shifted or oscillates at the native refresh rate of the display device. Alternatively, the offsetting the base pattern happens a different rate, not synchronized with the native refresh rate of the display device, which may result in less noticeable chromatic shift.

The successive rendering (620) facilitates evaluation of whether chromatic shift is induced among at least some sub-pixel display elements of the display device. In particular, the base pattern and offsetting are configured to trigger chromatic shift in response to imbalances introduced by overdrive control logic in overdrive adjustments among the sub-pixel display elements. Or, the base pattern and offsetting can be configured to trigger chromatic shift in response to imbalances in transition times among the sub-pixel display elements that are introduced by some other factor.

B. Example Base Patterns and Example Test Patterns

FIGS. 7a and 7b show example base patterns (701, 702) of a test pattern for motion-induced chromatic shift. A test pattern evaluation tool can use either of the base patterns (701, 702) in a test pattern to reveal motion-induced chromatic shifts due to mistimed or misaligned sub-pixel display elements.

The base pattern (701) in FIG. 7a is a 2×4 pattern of pixels with grayscale sample values. The base pattern (702) in FIG. 7b is also a 2×4 pattern of pixels with grayscale sample values, but the pattern shown in FIG. 7b is simpler than the pattern shown in FIG. 7a. In many cases, the pattern shown in FIG. 7b is less effective than the pattern shown in FIG. 7a at causing motion-induced chromatic shift. Alternatively, the base pattern includes another pattern of grayscale values or includes at least some non-grayscale values. Also, the base pattern can have a size other than 2×4 (e.g., 4×2, 2×3, 3×2, 2×2, 5×3, 3×5, and so on, or a much larger size, up to the size of the test pattern, in which case the base pattern is not replicated or repeated within the test pattern).

FIG. 8 shows a simple example test pattern (800) for motion-induced chromatic shift. The test pattern (800) can have an arbitrary size, filling an entire display device or only a portion of the display device (e.g., a window). The test pattern (800) is rendered at the native resolution of the display device. In the test pattern (800), a base pattern (such as the base pattern (701) shown in FIG. 7a, base pattern (702) shown in FIG. 7b, or other base pattern) is replicated throughout the test pattern (800) in each frame. From frame to frame, pixels oscillate by one pixel horizontally at the native refresh rate of the display device, advancing and returning at a regular rate. As needed, a column of pixels consistent with the pattern can be added at the left or right side of the test pattern (800). Alternatively, the replicated base pattern shifts by one pixel to the left (or right) on a frame-by-frame basis at the native refresh rate of the monitor, with the column of pixels that exits one side of the test pattern (800) being added back on the opposite side. Alternatively, instead of oscillating horizontally, for a different base pattern, the test pattern (800) can oscillate vertically.

On some display devices, rendering the test pattern (800) causes a chromatic shift throughout the test pattern (800) as sub-pixel display elements within the respective pixels of the test pattern (800) (or at least some of the respective pixels) fail to maintain uniform transition timing. The chromatic shift may be, for example, a solid area (810) of pink/magenta within the test pattern (800), or it may be a solid area (810) of green within the test pattern (800). In some cases, the color of the chromatic shift changes depending on the phase of the oscillation. If starting the oscillation by shifting to the right causes one color of chromatic shift (e.g., pink/magenta), then starting the oscillation by shifting to the left causes another color of chromatic shift (e.g., green). Typically, chromatic shift induced in one area of the test pattern (800) also appears in other areas of the test pattern (800), since the same base pattern is being shifted in the same way throughout the test pattern (800).

FIGS. 9a and 9b show example wipe test patterns (901, 902) for motion-induced chromatic shift. In FIG. 9a, the wipe test pattern (901) can have an arbitrary size, filling an entire display device or only a portion of the display device (e.g., a window). The wipe test pattern (901) is rendered at the native resolution of the display device. In the wipe test pattern (901), a base pattern (such as the base pattern (701) shown in FIG. 7a, base pattern (702) shown in FIG. 7b, or other base pattern) is replicated throughout the test pattern (901) in each frame. From frame to frame, pixels oscillate by one pixel horizontally at the native refresh rate of the display device, advancing and returning at a regular rate. As needed, a column of pixels consistent with the pattern can be added at the left or right side of the test pattern (901). Alternatively, the replicated base pattern shifts by one pixel to the left (or right) on a frame-by-frame basis at the native refresh rate of the monitor, with the column of pixels that exits one side of the test pattern (901) being added back on the opposite side. Alternatively, instead of oscillating horizontally, for a different base pattern, the test pattern (901) can oscillate vertically.

Unlike the test pattern (800) shown in FIG. 8, the wipe test pattern (901) shown in FIG. 9a includes a fixed boundary (910) between two areas, as well as a rotating arm (920) that provides a "wipe reveal" effect. The arm (920) rotates around the center of the wipe test pattern (901) in successive rendering operations. Pixels oscillate (or move) in opposite phases in each new rotation of the rotating arm (920), starting at the boundary (910) and being exposed behind the arm (920) as it rotates. In some display devices, this causes different chromatic shift in the area behind the rotating arm (920) and in the area ahead of the rotating arm (920). For example, when the arm rotates in a clockwise manner, a solid area (940) behind the rotating arm (920) in a given rotation exhibits one chromatic shift (e.g., green), and a solid area (930) ahead of the rotating arm (920) in the given rotation exhibits another chromatic shift (e.g., pink/magenta). The wipe test pattern (901) can start with a full field in the same phase, causing a uniform chromatic shift in the entire pattern. As the rotating arm (920) rotates, an area with a different, opposite phase of oscillation is exposed behind the arm (920), which may cause a different chromatic shift in the area behind the arm (920), compared to the area ahead of the arm (920) that still has the other phase. Thus, for most stages, the test pattern (901) can show two chromatic shifts at the same time.

The wipe test pattern (902) shown in FIG. 9b includes the features of the wipe test pattern (901) shown in FIG. 9a. The wipe test pattern (902) shown in FIG. 9b also includes reference areas (951-954). Each of the reference areas includes pixels of a predefined color, which illustrate a degree of chromatic shift. For example, the reference areas (951-954) include pixels with different colors of pink/magenta or green, against which chromatic shift induced in the test pattern (902) can be judged.

FIG. 10 shows an example warp test pattern (1001) for motion-induced chromatic shift. In FIG. 10, the warp test pattern (1001) can have an arbitrary size, filling an entire display device or only a portion of the display device (e.g., a window). The warp test pattern (1001) is rendered at the native resolution of the display device. In the warp test pattern (1001), a base pattern (such as the base pattern (701) shown in FIG. 7a, base pattern (702) shown in FIG. 7b, or other base pattern) is repeated throughout the test pattern (1001) in each frame, with the base pattern being scaled according to various scaling factors, stretched according to various stretching factors, and/or distorted at various distortion factors within the test pattern (1001). From time to time (e.g., every second, every five seconds), the way the base pattern is repeated within the test pattern (1001) can be changed slightly. Thus, the base pattern as repeated in the test pattern (1001) can be compressed and expanded from time to time over a period much longer than the period of oscillation.

In any case, from frame to frame, pixels oscillate by one pixel horizontally at the native refresh rate of the display device, advancing and returning at a regular rate. As needed, a column of pixels consistent with the pattern can be added at the left or right side of the test pattern (1001). Alternatively, the repeated base pattern shifts by one pixel to the left (or right) on a frame-by-frame basis at the native refresh rate of the monitor, with the column of pixels that exits one side of the test pattern (1001) being added back on the opposite side. Alternatively, instead of oscillating horizontally, for a different base pattern, the test pattern (1001) can oscillate vertically.

On some display devices, rendering the warp test pattern (1001) causes alternating waves of chromatic shift throughout the test pattern (1001) as sub-pixel display elements within the respective pixels of the test pattern (1001) (or at least some of the respective pixels) fail to maintain uniform transition timing. The chromatic shift may be, for example, a solid area (1030) of pink/magenta within the test pattern (1001) alternating with a solid area (1040) of green within the test pattern (1001).

C. Generating Base Patterns

FIGS. 11a and 11b show a code listing (1101) illustrating an approach to generating candidate base patterns for a test pattern for motion-induced chromatic shift. Specifically, the code listing (1101) is a Visual Basic Script macro for Excel 2010. In this approach, a sine wave is sampled at various locations in a window with dimensions DimX and DimY (a 200×200 window in the code listing of FIGS. 11a and 11b). The amplitude of the sine wave varies between 16 and 235, which thus define the range of grayscale values. The frequency of the sine wave changes depending on location. FIG. 12 shows the generated pattern (1200).

By using the generated pattern (1200) as the base pattern in a test pattern, which oscillates at the native refresh rate of a display device, areas that cause motion-induced chromatic shift can be isolated. The patterns of sample values in such isolated areas can be used as base patterns, which are then used throughout a test pattern. In the pattern (1200) shown in FIG. 12, chromatic shift is especially noticeable in areas located 45 degrees, 135 degrees, 225 degrees, and 315 degrees from the center of the pattern (1200). Such areas include the highest-frequency details of the pattern (1200).

More generally, uniform patterns such as checkerboards, stripes, rows, or diagonals do not tend to cause chromatic shift when oscillated as part of a test pattern. Complex waveform patterns are more likely to yield motion-induced chromatic shift. Certain patterns based on derivatives of sine waves (as shown within the graphic pattern (1200) of FIG. 12) tend to cause pronounced chromatic shift when oscillated as part of a test pattern, especially when the sine waves that are sampled have a period shorter than two pixels.

III. Example Computer Systems and Operating Environments

FIG. 13 illustrates a generalized example of a suitable computer system (1300) in which several of the described innovations may be implemented. The computer system (1300) is not intended to suggest any limitation as to scope of use or functionality, as the innovations may be implemented in diverse general-purpose or special-purpose computer systems.

With reference to FIG. 13, the computer system (1300) includes one or more processing units (1310, 1315) and memory (1320, 1325). The processing units (1310, 1315) execute computer-executable instructions. A processing unit can be a general-purpose CPU, processor in an ASIC or any other type of processor. In a multi-processing system, multiple processing units execute computer-executable instructions to increase processing power. For example, FIG. 13 shows a CPU (1310) as well as a GPU or co-processing unit (1315). The tangible memory (1320, 1325) may be volatile memory (e.g., registers, cache, RAM), non-volatile memory (e.g., ROM, EEPROM, flash memory, etc.), or some combination of the two, accessible by the processing unit(s). The memory (1320, 1325) stores software (1380) implementing one or more innovations for generating and/or using test patterns for motion-induced chromatic shift, in the form of computer-executable instructions suitable for execution by the processing unit(s).

A computer system may have additional features. For example, the computer system (1300) includes storage (1340), one or more input devices (1350), one or more output devices (1360), and one or more communication connections (1370). An interconnection mechanism (not shown) such as a bus, controller, or network interconnects the components of the computer system (1300). Typically, operating system software (not shown) provides an operating environment for other software executing in the computer system (1300), and coordinates activities of the components of the computer system (1300).

The tangible storage (1340) may be removable or non-removable, and includes magnetic disks, magnetic tapes or cassettes, optical storage media such as CD-ROMs or DVDs, or any other medium which can be used to store information and which can be accessed within the computer system (1300). The storage (1340) stores instructions for the software (1380) implementing one or more innovations for generating and/or using test patterns for motion-induced chromatic shift.

The input device(s) (1350) may be a touch input device such as a keyboard, mouse, pen, or trackball, a voice input device, a scanning device, or another device that provides input to the computer system (1300). For video, the input device(s) (1350) may be a camera, video card, TV tuner card, screen capture module, or similar device that accepts video input in analog or digital form, or a CD-ROM or CD-RW that reads video input into the computer system (1300). In particular, if the computer system (1300) uses the test patterns as part of a calibration process with a feedback loop (see below), a camera can capture images of the test patterns on a display device. The output device(s) (1360) include a display device such as an LCD device. The output device(s) may also include a printer, speaker, CD-writer, or another device that provides output from the computer system (1300).

The communication connection(s) (1370) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations presented herein can be described in the general context of computer-readable media. Computer-readable media are any available tangible media that can be accessed within a computing environment. By way of example, and not limitation, with the computer system (1300), computer-readable media include memory (1320, 1325), storage (1340), and combinations of any of the above. As used herein, the term computer-readable media does not cover, encompass, or otherwise include carrier waves or signals per se.

The innovations can be described in the general context of computer-executable instructions, such as those included in program modules, being executed in a computer system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or computer device. In general, a computer system or computer device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a GPU, or a programmable logic device ("PLD") such as a field programmable gate array ("FPGA")) specially designed or configured to implement any of the disclosed methods.

For the sake of presentation, the detailed description uses terms like "determine," "set," and "use" to describe computer operations in a computer system. These terms are high-level abstractions for operations performed by a computer, and should not be confused with acts performed by a human being. The actual computer operations corresponding to these terms vary depending on implementation.

IV. Alternatives and Variations

In most of the preceding examples, test patterns are used to detect motion-induced chromatic shift. Such test patterns can also be used as part of a feedback loop, if the cause of the motion-induced chromatic shift can be addressed by tuning, calibrating, or otherwise adjusting a setting of a display device, or if sample values can be adjusted to mitigate motion-induced chromatic shift.

For example, in a feedback loop, a calibration tool records an image of the test pattern as rendered on a display device. The image can be recorded using a camera or other capture device. The calibration tool determines whether the image shows chromatic shift. For example, the calibration tool compares original sample values with sample values as rendered on the display device, then decides whether chromatic shift has been induced. Or, the calibration tool receives user input that indicates the presence of chromatic shift (or a degree of chromatic shift), then decides whether chromatic shift has been induced based on the user input. If chromatic shift is detected, in response to determining that the image shows chromatic shift, the calibration tool adjusts one or more settings of the display device, one or more settings of a video card, and/or one or more other settings for processing of sample values to mitigate the chromatic shift. The calibration tool can repeat this process multiple times to address motion-induced chromatic shift in the display device.

The calibration tool can be a software program executing on a computer system having an associated display device (e.g., laptop computer, personal computer). The software program can be a special-purpose application for display device calibration, a control in a Web browser window, or some other software program. Or, the calibration tool can be implemented in logic in a hardware component (e.g., as part of system on a chip for a video card, as part of a component of a gaming console). Or, the calibration tool can be implemented in a display device itself (e.g., as part of the functionality for an on-screen display menu for device settings or calibration, which may be provided through firmware on the display device).

In many of the examples described herein, the display device is an LCD device. Alternatively, the test patterns for motion-induced chromatic shift can be used to identify problems with another type of display device that has sub-pixel display elements (e.g., a LED device, OLED device, quantum dot display device, where sub-pixel display elements for a pixel may have different transition times). For example, one of the test patterns can be used to identify a problem with the timing of signals to the sub-pixel display elements or a problem with control logic for the sub-pixel display elements.

In many of the examples described herein, the test pattern uses a base pattern of grayscale values. Using grayscale values such as white, various shades of gray, and black can make chromatic shift more readily apparent to a human viewer. In contrast, chromatic shift may be masked (less perceptible for a human viewer) by a test pattern that uses values other than grayscale values. Alternatively, however, a test pattern in which a base pattern includes at least some non-grayscale values can be used.

In many of the examples described herein, chromatic shift is a shade of green or pink/magenta. Alternatively, chromatic shift has another color (e.g., blue, cyan, orange, yellow).

More generally, various alternatives to the examples presented herein are possible. For example, some of the methods presented herein can be altered by changing the ordering of the method acts described, by splitting, repeating, or omitting certain method acts, etc. The various aspects of the disclosed technology can be used in combination or separately. Different embodiments use one or more of the described innovations. Some of the innovations presented herein address one or more of the problems noted in the background. Typically, a given technique/tool does not solve all such problems.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable memory or storage devices storing computer-executable instructions for causing a processor, when programmed thereby, to perform test pattern evaluation comprising:
   determining a test pattern that is based at least in part on a base pattern of pixels, wherein the base pattern is a textured pattern of grayscale values, each of the pixels in the base pattern including multiple sub-pixel sample values; and
   testing for motion-induced chromatic shift in a display device having sub-pixel display elements by successively rendering the test pattern for display on the display device, including moving the base pattern by a number of pixels between successive rendering operations for the test pattern to facilitate evaluation of whether the motion of the base pattern induces chromatic shift in areas of the grayscale values of the base pattern, wherein the motion-induced chromatic shift is shift in displayed color values away from correct color values.

2. The one or more computer-readable memory or storage devices of claim 1, wherein the base pattern and the moving are configured to trigger chromatic shift in response to imbalances introduced by control logic in overdrive adjustments among the sub-pixel display elements of the display device.

3. The one or more computer-readable memory or storage devices of claim 1, wherein the determining the test pattern includes loading the test pattern from a library of multiple predefined test patterns.

4. The one or more computer-readable memory or storage devices of claim 1, wherein the textured pattern of grayscale values is an n×m pattern of grayscale values that is replicated multiple times within the test pattern, and wherein each of n and m is a whole number that is a multiple of 2.

5. The one or more computer-readable memory or storage devices of claim 1, wherein the textured pattern of grayscale values is an n×m pattern of grayscale values, wherein each of n and m is a whole number that is a multiple of 2, and wherein the base pattern is repeated multiple times at various scaling factors, stretching factors, and/or distortion factors within the test pattern.

6. The one or more computer-readable memory or storage devices of claim 1, wherein the base pattern is based at least in part on sampling of a sine wave having a period of less than two pixels.

7. The one or more computer-readable memory or storage devices of claim 1, wherein the display device is a liquid crystal display ("LCD") device.

8. The one or more computer-readable memory or storage devices of claim 1, wherein the display device has a native refresh rate, and wherein the moving the base pattern happens at the native refresh rate of the display device.

9. The one or more computer-readable memory or storage devices of claim 1, wherein the moving the base pattern includes offsetting by one pixel horizontally between the successive rendering operations or includes offsetting by one pixel vertically between the successive rendering operations.

10. The one or more computer-readable memory or storage devices of claim 9, wherein the base pattern oscillates regularly between the successive rendering operations.

11. The one or more computer-readable memory or storage devices of claim 1, wherein the test pattern is a wipe test pattern, the wipe test pattern further including an arm that rotates around a center of the wipe test pattern in the successive rendering operations, and wherein phase of the moving is different on opposite sides of the arm within the test pattern.

12. The one or more computer-readable memory or storage devices of claim 11, wherein the wipe test pattern further includes multiple reference areas, each of the multiple reference areas including pixels that illustrate a degree of chromatic shift.

13. The one or more computer-readable memory or storage devices of claim 1, wherein the test pattern is a warp test pattern, the base pattern being repeated at various scaling factors, stretching factors, and/or distortion factors within the test pattern.

14. The one or more computer-readable memory or storage devices of claim 1, further storing computer-executable instructions for causing the processor, when programmed thereby, to perform calibration comprising, in a feedback loop:
 recording an image of the test pattern;
 determining whether the image shows chromatic shift; and
 in response to determining that the image shows chromatic shift, adjusting one or more attributes of the display device and/or a setting of a video card to mitigate the chromatic shift.

15. The one or more computer-readable memory or storage devices of claim 1, wherein the textured pattern of grayscale values:
 includes at least some high-frequency details;
 is a non-uniform pattern; and/or
 is based at least in part on sampling of a waveform pattern.

16. A method comprising:
 determining a test pattern that is based at least in part on a base pattern of pixels, wherein the base pattern is a textured pattern of grayscale values, each of the pixels in the base pattern including multiple sub-pixel sample values; and
 testing for motion-induced chromatic shift in a display device by successively rendering the test pattern for display on the display device, including moving the base pattern by a number of pixels between successive rendering operations for the test pattern, the base pattern and the moving being configured to trigger the motion-induced chromatic shift in areas of the grayscale values of the base pattern in response to imbalances introduced by control logic in overdrive adjustments among sub-pixel display elements of the display device, wherein the motion-induced chromatic shift is shift in displayed color values away from correct color values.

17. The method of claim 16, wherein the determining the test pattern includes loading the test pattern from a library of multiple predefined test patterns.

18. The method of claim 16, wherein the textured pattern of grayscale values is an n×m pattern of grayscale values that is replicated multiple times within the test pattern, and wherein each of n and m is a whole number that is a multiple of 2.

19. The method of claim 16, wherein the display device has a native refresh rate, and wherein the moving the base pattern happens at the native refresh rate of the display device.

20. The method of claim 16, wherein the moving includes offsetting by one pixel horizontally between the successive rendering operations or includes offsetting by one pixel vertically between the successive rendering operations.

21. The method of claim 16, wherein the textured pattern of grayscale values:
 includes at least some high-frequency details;
 is a non-uniform pattern; and/or
 is based at least in part on sampling of a waveform pattern.

22. A computer system comprising:
 a liquid crystal display ("LCD") device; and
 an evaluation tool comprising at least one processor configured to execute logic to:
  determine a test pattern that is based at least in part on a base pattern of pixels, wherein the base pattern is a textured pattern of grayscale values, each of the pixels in the base pattern including multiple sub-pixel sample values; and
  test for motion-induced chromatic shift in the LCD device by successively rendering the test pattern for display on the LCD device, including moving the base pattern by a number of pixels between successive rendering operations for the test pattern, the base pattern and shifting the moving being configured to trigger the motion-induced chromatic shift in areas of the grayscale values of the base pattern in response to imbalances in transition times among sub-pixel display elements of the LCD device, wherein the motion-induced chromatic shift is shift in displayed color values away from correct color values.

23. The computer system of claim 22, wherein the textured pattern of grayscale values:
 includes at least some high-frequency details;
 is a non-uniform pattern; and/or
 is based at least in part on sampling of a waveform pattern.

* * * * *